United States Patent [19]

Watanabe

[11] Patent Number: 5,354,837

[45] Date of Patent: Oct. 11, 1994

[54] LOW-TEMPERATURE LIQUID URETHANE PREPOLYMER

[75] Inventor: Haruo Watanabe, Tokyo, Japan

[73] Assignee: Hodogaya Chemical Co., Ltd., Tokyo, Japan

[21] Appl. No.: 164,544

[22] Filed: Dec. 10, 1993

[30] Foreign Application Priority Data

Dec. 22, 1992 [JP] Japan .................................. 4-356456

[51] Int. Cl.$^5$ .................................................. C08G 18/10
[52] U.S. Cl. .......................................... 528/76; 528/77; 528/79
[58] Field of Search ............................... 528/76, 77, 79

[56] References Cited

U.S. PATENT DOCUMENTS 4,992,524  2/1991  Coady et al. .

FOREIGN PATENT DOCUMENTS 0284289  9/1988  European Pat. Off. .
0343985  11/1989  European Pat. Off. .

Primary Examiner—Maurice J. Welsh
Attorney, Agent, or Firm—Oblon, Spivak, McClelland, Maier & Neustadt

[57] ABSTRACT

An isocyanate-terminated urethane prepolymer prepared by a urethane reaction between (A) a dihydroxypolyol and (B) an isocyanate compound, wherein the dihydroxypolyol is a mixture of (a) a polyether glycol or a polyether ester glycol containing an oxytetramethylene group and having a molecular weight of from 600 to 5,000 and (b) poly(tetramethylene ether/3-methyltetramethylene ether) glycol comprising a structural unit represented by formula (I):

$$-CH_2CH_2CH_2CH_2O- \qquad (I)$$

and from 5 to 40% by weight of a structural unit represented by formula (II) based on (b) poly(tetramethylene ether/3-methyltetramethylene ether) glycol:

$$-CH_2-\underset{\underset{R_1}{|}}{CH}-\underset{\underset{R_2}{|}}{CH}-CH_2-O- \qquad (II)$$

wherein $R_1$ and $R_2$ each represent a hydrogen atom or a methyl group, at least one of them being a methyl group, and having a molecular weight of from 500 to 5,000, with the proportion of (b) based on the total dihydroxypolyol (A) being from 1 to 50% by weight, at a B/A molar ratio of from 1.2 to 2.2. The urethane prepolymer exhibits liquid nature at low temperature of 10° C. or even less and therefore shows improved workability on mixing with a chain extender, a crosslinking agent, an elastomer modifying filler, and so forth.

5 Claims, No Drawings

LOW-TEMPERATURE LIQUID URETHANE PREPOLYMER

FIELD OF THE INVENTION

This invention relates to a urethane prepolymer useful as a starting material of adhesives, coatings, synthetic leather, etc. More particularly, it relates to a urethane prepolymer which is liquid at low temperatures and thereby exhibits improved miscibility with a crosslinking agent, a filler for elastomer modification, a colorant, etc.

BACKGROUND OF THE INVENTION

A polyurethane prepolymer is obtained by reacting a diol compound, such as a polyester glycol, a polyether glycol or a polycarbonate glycol, and an aliphatic or aromatic diisocyanate compound in the presence of excess isocyanate to form an isocyanate-terminated chain urethane compound.

The urethane prepolymer is further processed with various diol compounds or diamine compounds for chain extension or with a polyfunctional polyol for chain extension or curing in accordance with the end use to provide a urethane elastomer useful in the production of adhesives, coatings, synthetic leather, etc.

Further, having a highly reactive isocyanate group at the terminals thereof, the urethane prepolymer is subjected to an addition reaction with a hydroxy allyl or acrylate compound, such as 2-hydroxyethyl methacrylate, 2-hydroxypropyl methacrylate or allyl alcohol, or an epoxy compound, such as glycidol or glycerol diglycidyl ether, to provide a urethane acrylate or a urethane epoxy resin useful in the production of adhesives or coatings.

Urethane prepolymers thus useful as an elastomeric material in various fields may have a wide variety of structures depending on the starting combination of a polyol and an isocyanate compound used for the preparation. Among these starting materials, dihydroxypolyols selected from polytetramethylene ether glycol (PTG) obtained by ring-open polymerization of tetrahydrofuran, a polyol obtained by ring-open copolymerization of tetrahydrofuran and ε-caprolactone, γ-butyrolactone, ethylene oxide, propylene oxide, etc., and a polyether or polyether ester polyol obtained by block copolymerization of PTG and a glycol, e.g., polyethylene glycol, polypropylene glycol or polybutylene adipate, are widely employed because they provide urethane elastomers excellent in abrasion resistance, wet heat resistance, and impact resilience.

Of these dihydroxypolyols, PTG and some of the copolymer polyols, with the molecular weight of the oxytetramethylene group thereof being not more than 600, are capable of producing urethane prepolymers liquid in low temperatures. However, urethane elastomers, urethane acrylates or urethane epoxy resins prepared from such low-temperature liquid urethane prepolymers have a short soft segment (i.e., short molecular chain length of the polyol) and therefore encounter difficulty in producing soft products, such as an elastomer, a coating film, or synthetic leather.

On the other hand, those prepolymers obtained from a dihydroxypolyol whose oxytetramethylene group has a molecular weight exceeding 600 tend to have a considerably increased viscosity or to crystallize in lower temperatures (10° C. or lower). Therefore, they have poor miscibility with a chain extender, a crosslinking agent, a colorant, a plasticizer, or various fillers for elastomer modification, failing to provide a uniform compound. A non-uniform prepolymer compound hardly produces an elastomer with excellent mechanical properties and also exhibits poor workability when used for the production of coatings or synthetic leather. In order to improve workability of such a urethane prepolymer which is liable to increase in viscosity or to crystallize, an organic solvent, such as toluene, xylene, benzene, ethyl acetate or methyl ethyl ketone, has been added to inhibit an increase in viscosity or to prevent crystallization. However, use of these organic solvents gives rise to unfavorable problems of environmental pollution and harm to workers.

SUMMARY OF THE INVENTION

An object of the present invention is to provide a urethane prepolymer which does not crystallize in a temperature as low as 10° C. or less.

The above object is accomplished by a urethane prepolymer prepared by reacting a mixed polyol comprising a dihydroxypolyol selected from a polyether polyol or polyether ester polyol having an oxytetramethylene group and poly(tetramethylene ether/3-methyltetramethylene ether) glycol with an isocyanate compound.

The present invention provides an isocyanate-terminated urethane prepolymer prepared by a urethane reaction between (A) a dihydroxypolyol and (B) an isocyanate compound, wherein the dihydroxypolyol is a mixture of (a) a polyether glycol or a polyether ester glycol containing an oxytetramethylene group and having a molecular weight of from 600 to 5,000 (hereinafter referred to as polyol (a)) and (b) poly(tetramethylene ether/3-methyltetramethylene ether) glycol (hereinafter referred to as polyol (b)) comprising a structural unit represented by formula (I):

$$-CH_2CH_2CH_2CH_2O- \qquad (I)$$

and from 5 to 40% by weight of a structural unit represented by formula (II) based on polyol (b):

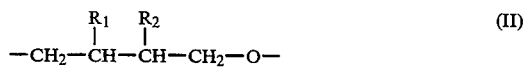

$$-CH_2-\underset{\underset{R_1}{|}}{CH}-\underset{\underset{R_2}{|}}{CH}-CH_2-O- \qquad (II)$$

wherein $R_1$ and $R_2$ each represent a hydrogen atom or a methyl group, at least one of them being a methyl group, and having a molecular weight of from 500 to 5,000, with the proportion of polyol (b) based on the total dihydroxypolyol (A) being from 1 to 50% by weight, at a (B) to (A) molar ratio of from 1.2 to 2.2.

DETAILED DESCRIPTION OF THE INVENTION

Examples of Polyol (a), i.e., a polyether glycol containing an oxytetramethylene group or a polyether ester glycol containing an oxytetramethylene group to be contained in dihydroxypolyol (A), include PTG obtained from ring-open polymerization of tetrahydrofuran, oxytetramethylene group-containing glycols obtained by copolymerization of tetrahydrofuran and ε-caprolactone, γ-butyrolactone, ethylene oxide or propylene oxide as disclosed in JP-A-63-105030 and JP-A-63-178131 (the term "JP-A" as used herein means an "unexamined published Japanese patent application"), and oxytetramethylene group-containing polyols obtained by block copolymerization of oxytetramethylene glycol and a glycol compound, e.g., polyethylene adipate, polypropylene adipate or polybutylene adipate, as disclosed in JP-A-1-252630 and JP-A-2-11628. Polyol (a) has a molecular weight of from 600 to 5,000, and preferably from 800 to 2,000.

The molecular weight of the polyols in the present invention means a number average molecular weight, and can be obtained, for example, by measuring the number of the hydroxyl groups present in the polyols by means of the acetylation method.

Polyol (b) which can be used in the present invention serves as a crystallization inhibitor at a low temperature, and consists of (I) and (II) as structural units. The mode of polymerization of structural units (I) and (II) is random copolymerization. Polyol (b) is obtained by random copolymerization of tetrahydrofuran and 3-methyltetrahydrofuran in the presence of a known polymerization initiator either alone or in combination with an anhydride or an accelerator. Usable polymerization initiators include protonic acids, e.g., $HClO_4$, $HSO_3F$, $HSOO_3Cl$, and $HBF_4$; ion complexes, e.g., $(C_2H_5)_3OBF_3$, $CH_3COSbCl_6$, and $C_6H_5N_2PF_6$; and catalyst systems for ring-open polymerization of tetrahydrofuran, e.g., $CH_3COCl$-$BF_3$, $SOCl_2$-$AlCl_3$, and $POCl_3$-$FeCl_3$.

The content of structural unit (II) in polyol (b) is preferably from 5 to 40% by weight, and more preferably from 8 to 25% by weight.

Polyol (b) has a molecular weight of from 500 to 5,000, and preferably from 800 to 3,000.

The mixing ratio of polyol (b) in total dihydroxypolyol (A) is in the range of from 1 to 50% by weight, and preferably from 3 to 30% by weight.

Isocyanate compound (B) which can be used in the present invention includes 4,4'-diphenylmethane diisocyanate, 2,4- and/or 2,6-tolylene diisocyanate, m-phenylene diisocyanate, xylylene diisocyanate, hexamethylene diisocyanate, tetramethylene diisocyanate, 1,4-hexylene diisocyanate, 4,4'-biphenylene diisocyanate, 3,3'-dimethoxy-4,4'-biphenylene diisocyanate, 1,5-naphthalene diisocyanate, and tetramethylxylene diisocyanate. Carbodiimide-modified diisocyanate compounds, such as carbodiimide-modified 4,4'-diphenylmethane diisocyanate, may also be used.

The urethane prepolymer according to the present invention can be prepared by reacting dihydroxypolyol (A) with diisocyanate compound (B) at a B/A molar ratio of from 1.2 to 2.2, and preferably from 1.5 to 2.0. The reaction is carried out with stirring at a temperature of from 40° to 120° C., and preferably from 60° to 90° C. for a period of from 2 to 5 hours.

The present invention will now be illustrated in greater detail by way of Examples, but the present invention should not be construed as being limited thereto. All the percents are given by weight unless otherwise specified.

EXAMPLE 1

In a 300 ml separable flask equipped with a thermometer and a stirrer were charged 80.0 g of polytetramethylene ether glycol ("PTG-850SN" produced by Hodogaya Chemical Co., Ltd.; molecular weight: 850) and 20.0 g of poly(tetramethylene ether/3-methyltetramethylene ether) glycol prepared by a known process (3-methyltetramethylene ether unit content: 16%; molecular weight: 1,000) and dried by heating at 100° C. in vacuo (5 mmHg) for 2 hours while stirring. The temperature was lowered to 80° C., and 30.6 g of 2,4-tolylene diisocyanate ("Coronate T-100" produced by Nippon Polyurethane Co., Ltd.) was added thereto to conduct a reaction for 3 hours to obtain an isocyanate-terminated prepolymer (isocyanate/polyol molar ratio: 1.5).

The viscosity of the resulting urethane prepolymer at 10° C., 20° C. or 30° C. is shown in Table 1 below.

EXAMPLE 2

A mixed polyol consisting of 90.0 g of PTG-850SN and 10 g of poly(tetramethylene ether/3-methyltetramethylene ether) glycol (3-methyltetramethylene ether unit content: 16%; molecular weight: 1,000) and 30.8 g of 2,4-tolylene diisocyanate were reacted in the same manner as in Example 1 to obtain an isocyanate-terminated urethane prepolymer (isocyanate/polyol molar ratio: 1.5).

The viscosity of the resulting urethane prepolymer at 10° C., 20° C. or 30° C. is shown in Table 1.

EXAMPLE 3

A mixed polyol consisting of 95.0 g of PTG-850SN and 5.0 g of poly(tetramethylene ether/3-methyltetramethylene ether) glycol (3-methyltetramethylene ether unit content: 16%; molecular weight: 1,000) and 31.0 g of 2,4-tolylene diisocyanate were reacted in the same manner as in Example 1 to obtain an isocyanate-terminated urethane prepolymer (isocyanate/polyol molar ratio: 1.5).

The viscosity of the resulting urethane prepolymer at 10° C., 20° C. or 30° C. is shown in Table 1.

EXAMPLE 4

A mixed polyol consisting of 96.0 g of polytetramethylene ether glycol ("PTG-1000" produced by Hodogaya Chemical Co., Ltd.; molecular weight: 1000) and 24.0 g of poly(tetramethylene ether/3-methyltetramethylene ether) glycol (3-methyltetramethylene ether unit content: 16%; molecular weight: 1,000) and 33.9 g of 2,4-tolylene diisocyanate were reacted in the same manner as in Example 1 to obtain an isocyanate-terminated urethane prepolymer (isocyanate/polyol molar ratio: 1.6).

The viscosity of the resulting urethane prepolymer at 10° C., 20° C. or 30° C. is shown in Table 1.

EXAMPLE 5

A mixed polyol consisting of 108.0 g of PTG-1000 and 12.0 g of poly(tetramethylene ether/3-methyltetramethylene ether) glycol (3-methyltetramethylene ether unit content: 16%; molecular weight: 1,000) and 33.9 g of 2,4-tolylene diisocyanate were reacted in the same manner as in Example 1 to obtain an isocyanate-terminated urethane prepolymer (isocyanate/polyol molar ratio: 1.6).

The viscosity of the resulting urethane prepolymer at 10° C., 20° C. or 30° C. is shown in Table 1.

EXAMPLE 6

A mixed polyol consisting of 97.0 g of PTG-1000 and 3.0 g of poly(tetramethylene ether/3-methyltetramethylene ether) glycol (3-methyltetramethylene ether unit content: 16%; molecular weight: 1,000) and 34.7 g of 2,4-tolylene diisocyanate were reacted in the same manner as in Example 1 to obtain an isocyanate-terminated urethane prepolymer (isocyanate/polyol molar ratio: 2.0).

The viscosity of the resulting urethane prepolymer at 10° C. 20° C. or 30° C. is shown in Table 1.

EXAMPLES 7 TO 9

Polytetramethylene ether glycol ("PTG-2000" produced by Hodogaya Chemical Co., Ltd.; molecular weight: 2,070) was mixed with poly(tetramethylene ether/3-methyltetramethylene ether) glycol (3-methyltetramethylene ether unit content: 16%; molecular weight: 1,990) to prepare a mixed polyol having the content of the latter polyol of 50%, 30% or 10%. An isocyanate-terminated urethane prepolymer having an isocyanate/polyol molar content of 2.0 was prepared from each of the mixed polyols and 2,4-tolylene diisocyanate in the same manner as in Example 1.

The viscosity of the resulting urethane prepolymer at 10° C., 20° C. or 30° C. is shown in Table 1.

EXAMPLE 10

A mixed polyol consisting of 97.0 g of PTG-2000 (molecular weight: 2,070) and 3.0 g of poly(tetramethylene ether/3-methyltetramethylene ether) glycol (3-methyltetramethylene ether unit content: 16%; molecular weight: 1,990) and 16.9 g of 2,4-tolylene diisocyanate were reacted in the same manner as in Example 1 to obtain an isocyanate-terminated urethane prepolymer (isocyanate/polyol molar ratio: 2.0).

The viscosity of the resulting urethane prepolymer at 10° C., 20° C. or 30° C. is shown in Table 1.

EXAMPLES 11 TO 13

Each of the mixed polyols used in Examples 1 to 3 was reacted with 4,4'-diphenylmethane diisocyanate ("Millionate MT" produced by Nippon Polyurethane Co., Ltd.) in the same manner as in Example 1 to obtain an isocyanate-terminated urethane prepolymer (isocyanate/polyol molar ratio: 2.0).

The viscosity of the resulting urethane prepolymer at 10° C., 20° C. or 30° C. is shown in Table 1.

COMPARATIVE EXAMPLE 1

PTG-850SN and 2,4-tolylene diisocyanate were reacted in the same manner as in Example 1 to obtain an isocyanate-terminated urethane prepolymer (isocyanate/polyol molar ratio: 1.5).

The viscosity of the resulting urethane prepolymer at 10° C., 20° C. or 30° C. is shown in Table 1.

COMPARATIVE EXAMPLE 2

An isocyanate-terminated urethane prepolymer was prepared in the same manner as in Comparative Example 1, except for changing the isocyanate/polyol molar ratio to 2.0.

The viscosity of the resulting urethane prepolymer at 10° C., 20° C. or 30° C. is shown in Table 1.

COMPARATIVE EXAMPLE 3

PTG-850SN and 4,4'-diphenylmethane diisocyanate were reacted in the same manner as in Example 1 to obtain an isocyanate-terminated urethane prepolymer (isocyanate/polyol molar ratio: 2.0).

The viscosity of the resulting urethane prepolymer at 10° C., 20° C. or 30° C. is shown in Table 1.

COMPARATIVE EXAMPLE 4

PTG-2000 and 2,4'-tolylene diisocyanate were reacted in the same manner as in Example 1 to obtain an isocyanate-terminated urethane prepolymer (isocyanate/polyol molar ratio: 2.0).

The viscosity of the resulting urethane prepolymer at 10° C., 20° C. or 30° C. is shown in Table 1.

TABLE 1

| Example No. | Mol. Wt. of Polyol (a) | Proportion of Polyol (b) in Total Polyol (%) | Isocyanate Compound | NCO/OH Molar Ratio* | Viscosity**** (CP) of Prepolymer 30° C. | 20° C. | 10° C. |
| --- | --- | --- | --- | --- | --- | --- | --- |
| Example 1 | 850 | 20 | 2,4TDI** | 1.5 | $4.6 \times 10^4$ | $9.2 \times 10^4$ | $22.7 \times 10^4$ |
| Example 2 | 850 | 10 | 2,4TDI | 1.5 | $4.8 \times 10^4$ | $8.6 \times 10^4$ | $21.8 \times 10^4$ |
| Example 3 | 850 | 5 | 2,4TDI | 1.5 | $4.4 \times 10^4$ | $8.5 \times 10^4$ | $22.0 \times 10^4$ |
| Example 4 | 1000 | 20 | 2,4TDI | 1.6 | $3.4 \times 10^4$ | $7.2 \times 10^4$ | $15.6 \times 10^4$ |
| Example 5 | 1000 | 10 | 2,4TDI | 1.6 | $3.0 \times 10^4$ | $6.7 \times 10^4$ | $18.5 \times 10^4$ |
| Example 6 | 1000 | 3 | 2,4TDI | 2.0 | $0.6 \times 10^4$ | $1.8 \times 10^4$ | $3.3 \times 10^4$ |
| Example 7 | 2000 | 50 | 2,4TDI | 2.0 | $1.3 \times 10^4$ | $2.8 \times 10^4$ | $12.3 \times 10^4$ |
| Example 8 | 2000 | 30 | 2,4TDI | 2.0 | $1.4 \times 10^4$ | $2.7 \times 10^4$ | $9.0 \times 10^4$ |
| Example 9 | 2000 | 10 | 2,4TDI | 2.0 | $1.4 \times 10^4$ | $2.7 \times 10^4$ | $25.6 \times 10^4$ |
| Example 10 | 2000 | 3 | 2,4TDI | 2.0 | $1.2 \times 10^4$ | $2.7 \times 10^4$ | $40.0 \times 10^4$ |
| Example 11 | 850 | 20 | MT*** | 2.0 | $3.9 \times 10^4$ | $9.4 \times 10^4$ | $19.8 \times 10^4$ |
| Example 12 | 850 | 10 | MT | 2.0 | $3.9 \times 10^4$ | $8.6 \times 10^4$ | $18.0 \times 10^4$ |
| Example 13 | 850 | 5 | MT | 2.0 | $3.9 \times 10^4$ | $8.2 \times 10^4$ | $17.6 \times 10^4$ |
| Compar. Example 1 | 850 | 0 | 2,4TDI | 1.5 | $3.0 \times 10^4$ | $6.7 \times 10^4$ | crystallization |
| Compar. Example 2 | 850 | 0 | 2,4TDI | 2.0 | $0.5 \times 10^4$ | $1.2 \times 10^4$ | crystallization |
| Compar. Example 3 | 850 | 0 | MT | 2.0 | $3.3 \times 10^4$ | $8.0 \times 10^4$ | crystallization |
| Compar. Example 4 | 2000 | 0 | 2,4TDI | 2.0 | $1.5 \times 10^4$ | $3.0 \times 10^4$ | crystallization |

Note:
*Charged diisocyanate/charged single or mixed polyol molar ratio
**2,4-Tolylene diisocyanate
***4,4'-Diphenylmethane diisocyanate
****The viscosity of each prepolymer was measured using a Vismetlon rotational viscometer (VA-1 type).

As described and demonstrated above, the urethane prepolymer according to the present invention exhibits liquid nature at low temperature of 10° C. or even less and therefore shows improved workability on mixing with a chain extender, a crosslinking agent, an elastomer modifying filler, and so forth.

While the invention has been described in detail and with reference to specific examples thereof, it will be apparent to one skilled in the art that various changes and modifications can be made therein without departing from the spirit and scope thereof.

What is claimed is:

1. An isocyanate-terminated urethane perpolymer prepared by a urethane reaction between (A) a dihydroxypolyol and (B) an isocyanate compound, wherein said dihydroxypolyol is a mixture of (a) a polyether glycol containing an oxytetramethylene group and having a molecular weight of from 600 to 5,000 or a polyether ester glycol containing an oxytetramethylene group and having a molecular weight of from 600 to 5,000 and (b) poly(tetramethylene ether/3-methyltetramethylene ether) glycol having a molecular weight of from 500 to 5,000, comprising a structural unit represented by formula (I):

$$-CH_2CH_2CH_2CH_2O- \quad (I)$$

and from 5 to 40% by weight based on the weight of (b) of a structural unit represented by the formula II

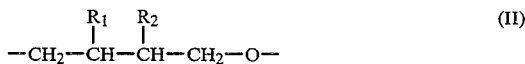

wherein $R_1$ and $R_2$ each represent a hydrogen atom or a methyl group, at least one of them being a methyl group, where the proportion of (b) based on the total dihydroxypolyol (A) is from 1 to 50% by weight, at a B/A molor ratio of from 1.2 to 2.2.

2. An isocyanate-terminated urethane prepolymer as claimed in claim 1, wherein said polyether glycol or polyether ester glycol containing an oxytetramethylene group has a molecular weight of from 800 to 2,000.

3. An isocyanate-terminated urethane prepolymer as claimed in claim 1, wherein said poly(tetramethylene ether/3-methyltetramethylene ether) glycol (b) comprises from 8 to 25% by weight of said structural unit (II).

4. An isocyanate-terminated urethane prepolymer as claimed in claim 1, wherein said poly(tetramethylene ether/3-methyltetramethylene ether) glycol (b) has a molecular weight of from 800 to 3,000.

5. An isocyanate-terminated urethane prepolymer as claimed in claim 1, wherein the proportion of said poly(tetramethylene ether/3-methyltetramethylene ether) glycol (b) based on the total dihydroxypolyol (A) is from 3 to 30% by weight.

* * * * *